May 10, 1932. C. W. SMITH 1,857,409

AUTOMATIC CUT-OFF VALVE FOR STORAGE TANKS

Filed Sept. 4, 1928

Inventor
Clarence W. Smith

By Jack A. Schley
Attorney

Patented May 10, 1932

1,857,409

UNITED STATES PATENT OFFICE

CLARENCE W. SMITH, OF MEXIA, TEXAS, ASSIGNOR OF ONE-HALF TO PEARL BUCHANAN AND ONE-FOURTH TO LEMUEL G. VANDERSALL

AUTOMATIC CUT-OFF VALVE FOR STORAGE TANKS

Application filed September 4, 1928. Serial No. 303,871.

This invention relates to new and useful improvements in automatic cut-off valves for storage tanks.

In the storage of oil and other composite liquids, certain solid and foreign matter will settle to the bottom of the tank and it is desirable in drawing off the liquid, to do so without disturbing this sediment. In the oil fields several tanks may be connected to one oil line and therefore it is necessary to draw liquid from one tank without interfering with the other tanks.

One of the objects of the invention is to provide a valve so arranged as to exclude air from entering the valve when liquid is being drawn from the tank, thereby maintaining a liquid prime and preventing interference with other tanks.

Another object of the invention is to provide a float valve carrying a depending member adapted to surround and hang below the valve seat, thus being constantly immersed and below the liquid level, whereby air is prevented from entering the valve seat or discharge pipe at any time during the discharging period.

A further object of the invention is to provide a vacuum release for the valve when seated.

A still further object of the invention is to provide a guard below the valve seat for preventing the outflowing liquid stirring up the sediment.

A construction designed to carry out the invention will be hereinafter described, together with other features of the invention.

Figure 1:
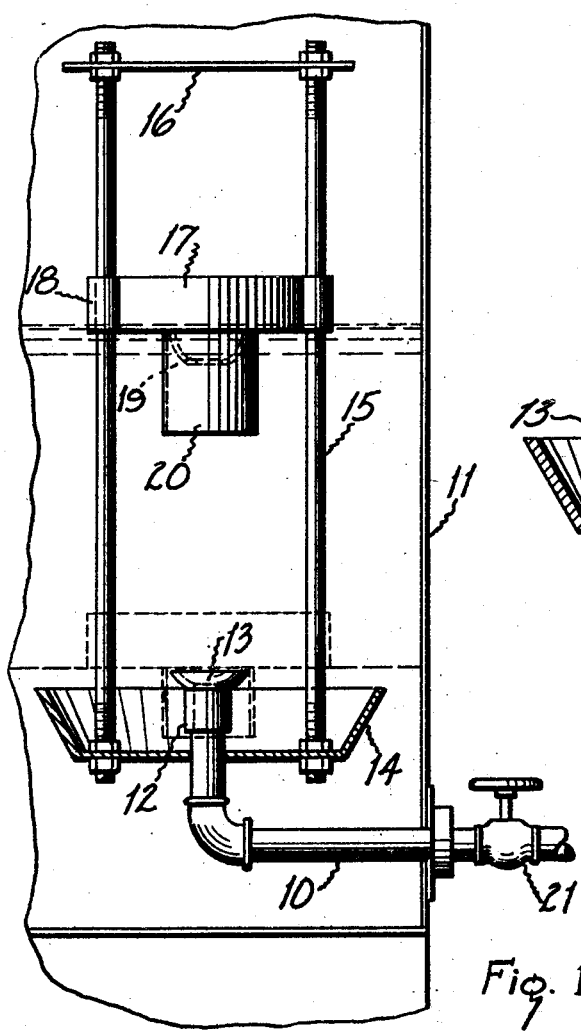
Figure 2:
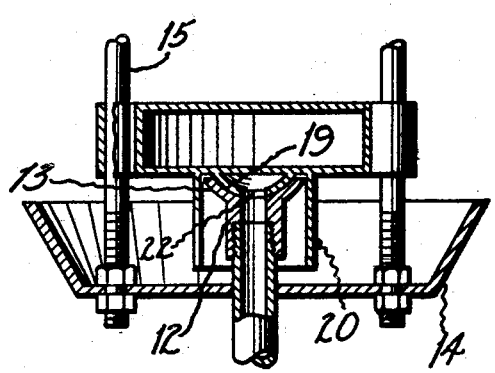
Figure 3:
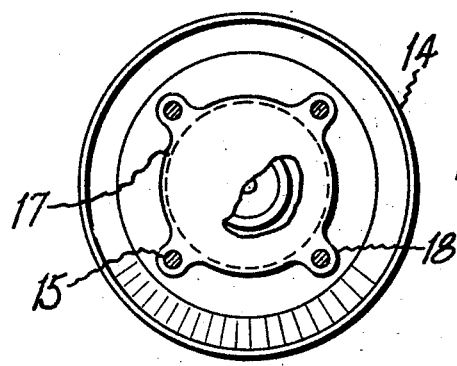

The invention will be more readily understood from a reading of the following specification and by reference to the accompanying drawings, in which an example of the invention is shown, and wherein:

Fig. 1 is a view partly in section and partly in elevation showing a valve constructed in accordance with the invention arranged in a storage tank, Fig. 2 is a sectional view showing the valve closed, and Fig. 3 is a plan view.

In the drawings the numeral 10 designates a right angular discharge pipe extending through the side of a storage tank 11. On the upper end of the pipe is a head 12, attached by screw threads or other means. The head has a bowl or cup 13 forming a valve seat through which the liquid flows to the pipe 10.

A flanged guard trough 14 surrounds the pipe 10 just below the head and acts to prevent the suction of the effluent from disturbing the sediment just above which the guard is located. Upright guide rods 15 extend from the bottom of the trough. A cap plate 16 attached to the upper ends of said rods serves to space and rigidly connect them.

A hollow metallic float 17 has guide ears 18 slidable on the rods 15, whereby the float may readily rise and fall with the liquid in the tank. Centrally on its under side the float has a valve boss 19, which is shaped to fit snugly in the bowl 13 and seal the same against the inflow of the liquid.

A very important feature of the invention is an apron or skirt 20 depending from the float concentrically of the boss 19 and of such diameter as to telescope over the head and bowl 13. The skirt is constantly immersed in the liquid and when the float is lowered to the head the skirt surrounds the bowl so that the liquid must flow under the lower edge of said skirt and up to the bowl.

By this arrangement the boss 19 will seat in the bowl 13 when the liquid level reaches the top plane of the bowl, but the skirt 20 acting as a guard will prevent air entering the bowl 13 or pipe 10. The valve is entirely automatic and is operated by the rise and fall of the liquid in the tank.

The pipe 10 has a cut-off valve 21 outside of the tank which is closed to retain the liquid in the tank and is also closed after the liquid is drained and the automatic valve closes. When the automatic valve is closed and the valve 21 is closed, ordinarily a slight vacuum would be set up in the pipe 10, so that when liquid was again supplied to the tank, the float would not rise and the boss 19 would be be held in the bowl 13. To overcome this the boss is made hollow and has a central bottom opening 22. When the boss 19 is a short distance above the bowl 13 (say one inch clearance) the suction in the pipe 10 will cause said boss to seat, thus trapping the air which is contained in said boss. When valve 21 is closed the liquid in the pipe 10 is trapped. The float still being buoyant will tend to rise, thus breaking the air suction and releasing the valve. Air is more elastic than oil and the seal is easily broken.

Various changes in the size and shape of the different parts, as well as modifications and alterations, may be made within the scope of the appended claims.

What I claim, is:

1. In an automatic cut-off valve for liquid storage tanks, a discharge pipe having a valve seat at its inlet end, a float carrying a valve member for engaging the valve seat, means carried by the float for preventing air entering the valve seat, and a guard below the valve seat preventing the effluent stirring up the sediment in the bottom of the tank.

2. An automatic cut-off valve for liquid storage tanks including a discharge pipe, a valve for closing the inlet end of the pipe, a float for operating the valve, means carried by the float and constantly immersed in the liquid for preventing air entering the pipe from the tank, and a guard below the valve preventing the effluent stirring up the sediment in the bottom of the tank.

3. In an automatic cut-off valve for liquid storage tanks, a discharge pipe having a valve seat at its inlet end, a float carrying a valve closing member for engaging the seat, and a cylindrical skirt carried by the float for telescoping over the valve seat when the valve closing member approaches said seat.

4. In an automatic cut-off valve for liquid storage tanks, a discharge pipe having a valve seat at its inlet end, a float carrying a valve closing member for engaging the seat, a cylindrical skirt carried by the float for telescoping over the valve seat when the valve closing member approaches said seat, and a guard below the valve seat preventing the effluent stirring up the sediment in the bottom of the tank.

5. In an automatic cut-off valve for liquid storage tanks, a discharge pipe, a head mounted on the pipe, a valve bowl carried by the head, a guide, a float movably vertically on the guide, a valve boss carried by the float for engaging the bowl, and a cylindrical skirt depending from the float around the boss for telescoping over the bowl.

In testimony whereof I affix my signature.

CLARENCE W. SMITH.